UNITED STATES PATENT OFFICE.

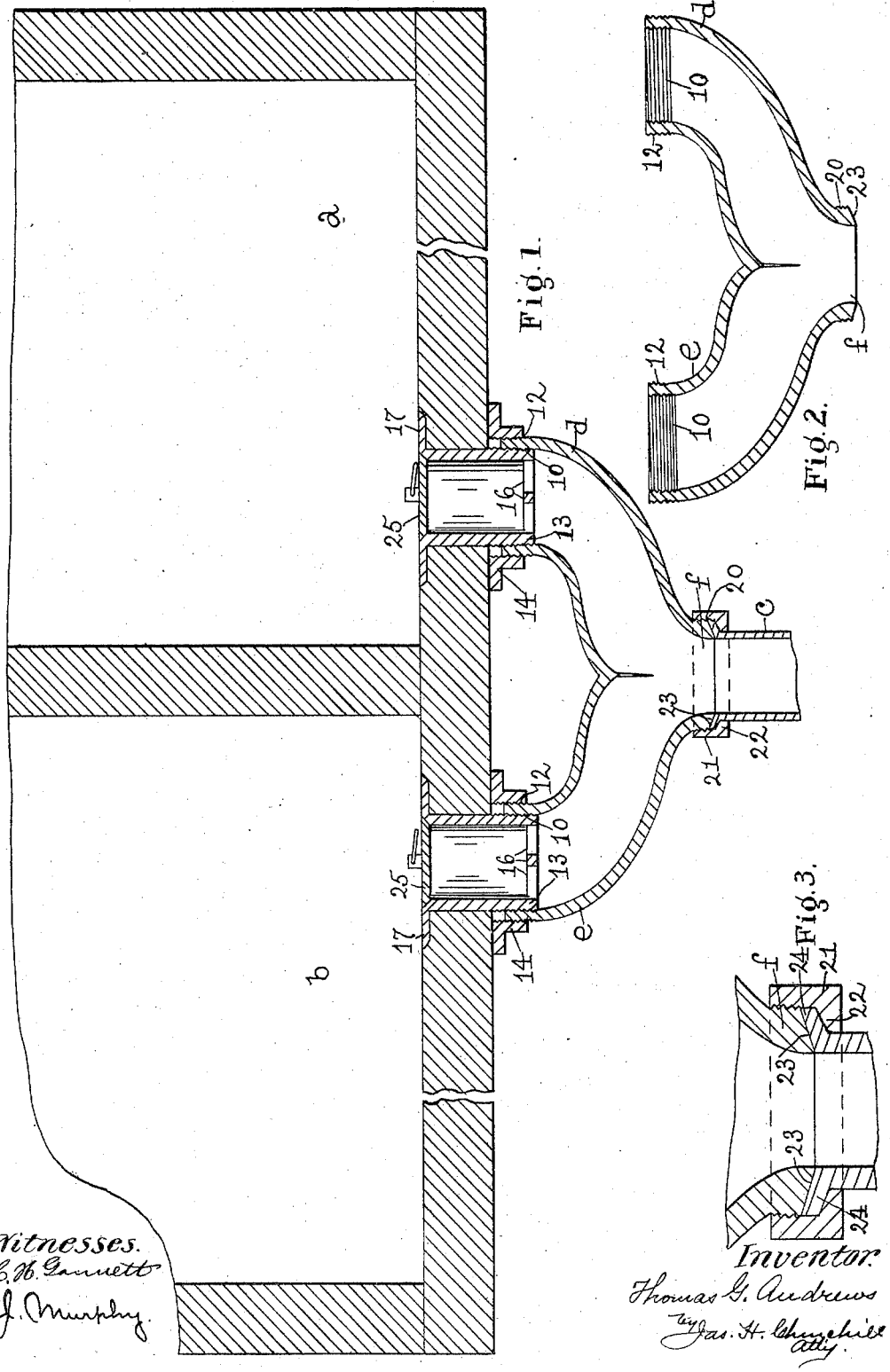

THOMAS G. ANDREWS, OF MALDEN, MASSACHUSETTS.

WASTE CONNECTION FOR WASHTUBS.

967,483. Specification of Letters Patent. Patented Aug. 16, 1910.

Application filed June 11, 1908. Serial No. 437,878.

*To all whom it may concern:*

Be it known that I, THOMAS G. ANDREWS, a citizen of the United States, residing in Malden, county of Middlesex, and State of Massachusetts, have invented an Improvement in Waste Connections for Washtubs, of which the following description, in connection with the accompanying drawings, is a specification, like letters on the drawings representing like parts.

This invention relates to a twin fitting for wash tubs or trays and has for its object to provide a simple, inexpensive and efficient fitting, which can be applied to and removed from the tubs or trays in a minimum time and with the least possible labor on the part of the plumber. For this purpose, I employ a twin fitting comprising a substantially Y-shaped pipe of cast-iron or other metal and provide the two branches or members of the fitting with external and internal screw-threads, for a purpose as will be described, and provide the common outlet member of the fitting with external screw-threads and with preferably a beveled lower edge to form a seat against which an expanded end of a lead pipe may be forced by a nut, which engages the screw-threads of said outlet member and is provided with an internally beveled flange, which coöperates with the beveled lower edge of the said outlet member to secure a liquid tight joint between said lead pipe and said fitting, as will be described. The branches of the twin fitting have coöperating with them strainer plugs which are made of a length greater than the thickness of the bottom of the trays so as to project below the same to enable the connection with the fitting to be made below the trays. These and other features of this invention will be pointed out in the claims at the end of this specification.

Figure 1 represents in section a set of wash tubs or trays having their outlets connected to a twin fitting embodying this invention and connected to a lead outlet or waste pipe. Fig. 2, a section of the twin fitting, and Fig. 3, a detail on an enlarged scale showing the outlet member of the fitting connected with the lead waste pipe.

Referring to the drawings, *a*, *b* represent two set tubs or wash-trays of any suitable or usual construction, having the water outlets in their bottoms connected with a lead waste pipe *c* by means of a twin fitting embodying this invention.

The twin fitting referred to, is composed of a Y-shaped casting of iron or other suitable metal and comprises the inlet branch pipes *d*, *e*, and the common outlet pipe section *f*. Each of the inlet branches *d*, *e*, is of greater external diameter than the outlet in the tray and is provided at its end with internal and external screw-threads 10, 12, which are engaged respectively by an externally threaded strainer sleeve 13 and nut 14.

The strainer sleeve 13 is made of a length greater than the thickness of the bottom of the tray so as to extend through the bottom of the tub or tray and is provided with the usual strainer bars 16 and flange 17, which is drawn down to its seat within the tub or tray by the nut 14, when the latter is turned up on the branch pipe of the fitting.

The common outlet pipe section *f* is provided with external screw-threads 20, which are engaged by a threaded collar or nut 21, which is provided at its lower end with an internally beveled flange 22, which coöperates with the beveled or inclined lower end or edge 23 of the pipe section, so as to secure the lead waste pipe *c* to the said pipe section and form a liquid tight joint therewith. To this end, the upper end of the lead pipe is expanded to form the lip 24, which is firmly pressed against the beveled lower edge 23 of the pipe section *f* by the nut 21 (see Figs. 1 and 3). The strainer sleeve 13 is provided with the usual plug 25.

From the above description and by reference to the drawing, it will be seen, that the twin fitting may be quickly and easily attached to and detached from the tubs or trays, and the lead pipe *c* can be also easily and quickly connected with the outlet pipe section *f* of the fitting, thereby materially lessening the expense and labor of connecting the trays with the waste pipe *c*.

By making the strainer sleeves 13 of a length greater than the thickness of the bottom of the trays, the connection with the fitting is made below the bottom of the trays, and the fitting can easily and quickly be detached from the strainer sleeve without danger of cracking the bottom of the tray or of injuring the fitting or the strainer sleeves, for it is only necessary to back off the nut 14 and hit the fitting a blow with the hand so as to move it upward toward the bottom of the tray, and a substantially light blow will be sufficient to loosen the strainer sleeve from the cement on which its head or flange is laid in order to obtain a water-tight joint. As soon as the strainer sleeve is started away from the cement, it is then free to be rotated to disconnect it from the fitting.

The fitting herein shown is not provided with an overflow pipe, but if desired it may be so provided.

Claims.

1. The combination with trays having water outlet openings, of a fitting having branches of greater external diameter than said openings and provided with external and internal screw-threads and having a common outlet pipe section provided with external screw-threads, threaded strainer sleeves of a length greater than the thickness of the bottom of said trays to project through the outlet openings in the said trays and engage the internal screw-threads of said branches below the bottoms of said trays, and nuts engaging the external screw-threads of said branches, substantially as described.

2. The combination with trays having water outlet openings, of a fitting having branches of greater external diameter than said openings and provided with external and internal screw-threads and having a common outlet pipe section provided with external screw-threads and with a beveled lower edge, threaded strainer sleeves of a length greater than the thickness of the bottom of said trays to project through the outlet openings in the said trays and engage the internal screw-threads of said branches below the bottoms of said trays, and nuts engaging the external screw-threads of said branches, substantially as described.

3. The combination with trays having water outlet openings, of a fitting having branches of greater external diameter than said outlet openings and provided with external and internal screw-threads and having a common outlet pipe section, threaded strainer sleeves of a length greater than the thickness of the bottom of said trays to project through the outlet openings in the said trays and engage the internal screw-threads of said branches below the bottoms of the trays, and nuts engaging the external screw-threads of said branches, substantially as described.

In testimony whereof, I have signed my name to this specification in the presence of two subscribing witnesses.

THOMAS G. ANDREWS.

Witnesses:
JAS. H. CHURCHILL,
J. MURPHY.